Dec. 22, 1959  H. J. McCREARY  2,918,549
CODE SWITCH
Filed June 19, 1956

INVENTOR.
HAROLD J. McCREARY
BY
ATTY.

2,918,549

CODE SWITCH

Harold J. McCreary, Lombard, Ill., assignor to General Telephone Laboratories, Incorporated, a corporation of Delaware Application June 19, 1956, Serial No. 592,365

12 Claims. (Cl. 200—98)

This invention relates in general to a selecting switch and more particularly relates to an arrangement wherein an energized magnet or magnets of a group of magnets move a switch wiper to an individually corresponding position or contact.

In general the present switch arrangement is contemplated for use in translating a digit registered in a codel relay arrangement such as employed in Strowger Automatic Toll Ticketing systems, an example of which is illustrated in United States Patent #2,385,228, granted on September 18, 1940, to John E. Ostline. As illustrated in the aforementioned patent each codel relay arrangement comprises four relays, which are energized in various combinations individually corresponding to a dialed digit. The energized relay or relays in turn controls the marking on a switch bank for controlling the selection of equipment corresponding to the dialed digit.

In the present arrangement the necessity for the complex marking arrangement controlled by the codel relays is eliminated by providing a wiper arm common to the relays or magnet as they might properly be called herein, and moving it a distance corresponding to the digit registered in the codel relays to extend a mark to a corresponding bank contact. It should be understood, however, that the present invention is not limited to the described system or codel relay arrangement, but has application as a selecting arrangement or selecting switch per se in many types of systems and arrangements.

Figure 1:
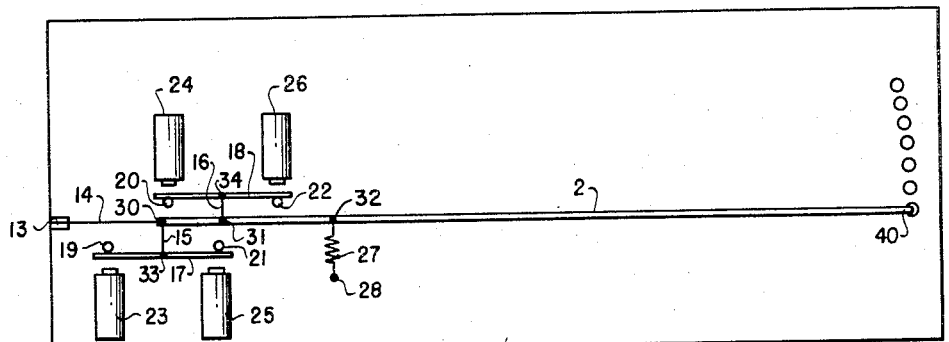
Figure 2:
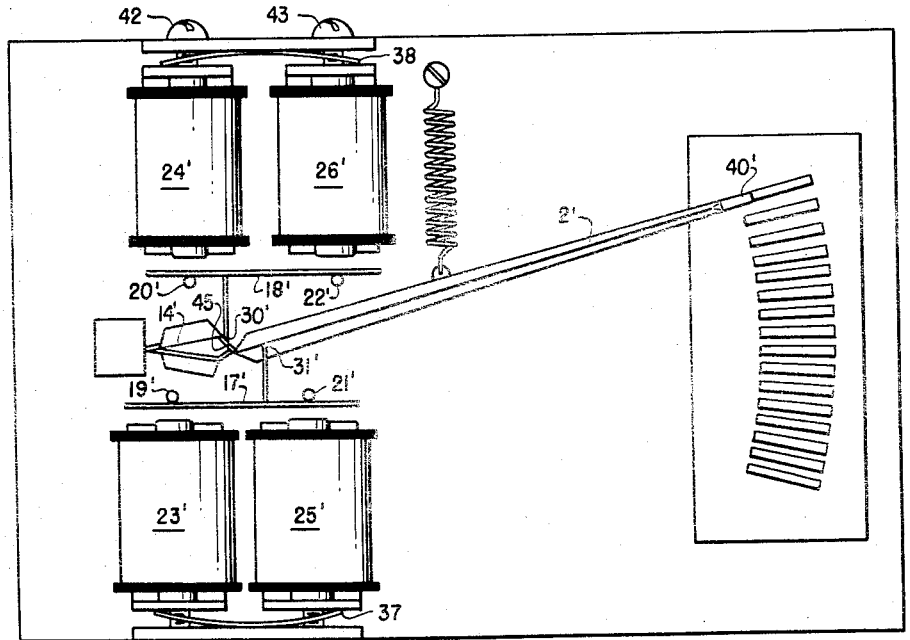
Figure 2A:
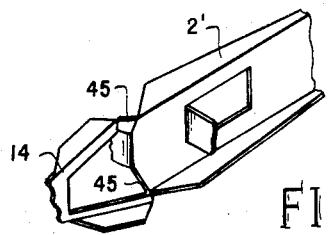

Referring to the drawings, Fig. 1 shows the general relationship of the various elements comprising the invention, while Fig. 2 is a slight modification of the arrangement shown in Fig. 1, and discloses more of the design details of the invention. Fig. 2a is an isometric view intended to show schematically one manner of connecting the wiper arm flexibly to a carrying plate while eliminating horizontal or lateral motion of the selecting or wiper arm on rotation thereof.

Referring to Fig. 1, a wiper arm 2, formed from sheet metal, is fastened to carrying plate 1 at point 13 by means of flexible leaf spring 14. Flexible leaf springs 15 and 16 are fastened to wiper 2 at points 30 and 31, respectively, and are also fastened to armatures 17 and 18, respectively, at points 33 and 34, respectively, to connect armature 2 to the control armatures 17 and 18. The armatures 17 and 18 are each controlled by a pair of the codel relays 23 and 25 and 24 and 26, respectively. The codel relays are also mounted on carrying plate 1, while the armatures 17 and 18 are provided with backstops 19 and 21 and 20 and 22, respectively, which are also mounted on plate 1. Helical spring 27 connected to wiper 2 at 32 and to plate 1 at 28 cooperates with armature 18 and back stops 20 and 22 to maintain wiper 2 in its home position. In this arrangement wiper 2 pivots or rotates in a counterclockwise direction about points 30 or 31 on energization of any of the relays in a manner that will be explained.

The gap between the pole piece of each relay and the control armature associated therewith is individually adjusted. Thus, for example, the gap for relay 23 is .01053"; for relay 25 is .0422"; for relay 24 is .02", and the gap for relay 26 is .08". The distance between point 31 and the right end of wiper 2 is, for example, ¾" and the distance between points 30 and 31 is ¼".

The energization of any one relay of a pair attracts its associated control armature 17 or 18, respectively, causing it to rotate about the respective back stop 19, 20, 21 or 22 associated with the unenergized relay of the pair. Points 33 and 34 are midway between their associated backstops 19 and 21 and 20 and 22, respectively, and therefore leaf springs 15 or 16 travel one-half the distance travelled by the armature in bridging the gap to the energized relay pole piece. Leaf spring 15 translates this movement to wiper 2 at a point 30, while leaf spring 16 translates this movement to wiper 2 at pivot point 31. If either relays 23 or 25 are energized, wiper 2 is caused to rotate about pivot point 31, as flexible member 16 yields, permitting wiper 2 to be moved slightly to the left and accommodate the rotation of spring 14 about point 13. As this movement is very slight and does not necessitate any special consideration of the contact distribution along the arc travelled by wiper 2, it need not be taken into account in calculating the ultimate movement of point 40 on wiper 2. Armature 18 is restrained by backstops 20 and 22 so that in effect wiper 2 rotates about point 31. If desired, side stops may be provided to limit sidewise motion of any armature. As point 30 moves downward .01053" ×½ on energization of relay 23 and a distance of .0422" ×½ on energization of relay 25 the point 40 on wiper 2 moves counterclockwise approximately $$\frac{4\frac{3}{4}}{\frac{1}{4}}$$

or 19 times the movement of pivot point 30. By providing a contact at the right end of wiper 2 in a position individually corresponding to the distance to which point 40 is moved by either relay 23 or 25 a corresponding marking is provided at that contact in any well-kown manner.

On the other hand, the energization of either relay 24 or 26 causes the associated armature 18 to be attracted for moving spring 16 a distance of one-half the gap between the armature 18 and the energized relay pole piece. Point 30 is then fixed in position due to armature 16 being restrained by stops 19 and 21. Wiper 2 rotates about point 30 and point 40 moves approximately $$\frac{5}{\frac{1}{4}}$$

or 20× as far as the upward movement of spring 16. In each case it will be noted that the small movement between the control armature and the associated energized relay pole piece is translated into a substantial movement at the right end of wiper 2 as that end is at a comparatively long distance from either pivot point. In the case of relays on opposite sides of wiper 2 being simultaneously energized, point 40 is moved a distance corresponding to ½×19×the movement of armature 17 plus ½×20×the movement of armature 18 and the placement of the corresponding contacts along the arc travelled by point 40 is adjusted accordingly.

The following chart shows in detail the movements in inches rounded off to the nearest decimal point of the point 40 on the energization of the different relays together with such explanatory figures as are believed helpful in understanding the movement.

| Relay | Gap | Pivot Point Movement | Point 40 |
|---|---|---|---|
| 23 | .01053 | .0105×½= 0.00525 | .00525×19=0.100 |
| 25 | .0422 | .0422×½= 0.0211 | .0211×19=.400 |
| 24 | .020 | .0200×½= 0.010 | .010×20=.200 |
| 26 | .080 | .080×½= 0.040 | .040×20=.800 |
| 23 and 24 | | | .00525×19+.010× 20=.30 |
| 25 and 23 | | | .0211×19+.00525× 19=.50 |
| 25 and 24 | | | .0211×19+.010× 20=.60 |
| 23 and 24 and 25 | | | .70 |
| 23 and 26 | | | .90 |
| 24 and 26 | | | 1.00 |
| 23 and 24 and 26 | | | 1.10 |
| 25 and 26 | | | 1.20 |
| 23 and 25 and 26 | | | 1.30 |
| 24 and 25 and 26 | | | 1.40 |
| 23 and 24 and 25 and 26 | | | 1.50 |

Turning now to the modification of the invention shown in Fig. 2 it will be noted that several changes are introduced in the arrangement for connecting wiper 2', corresponding to wiper 2 in Fig. 1, to the control armatures 17' and 18', corresponding to 17 and 18, respectively. Instead of connecting the wiper 2' to the center of control armatures 17' and 18', it is fastened at a point on armature 17' which is two thirds of the distance from backstop 19' to backstop 21', while it is fastened to a point on armature 18' which is two thirds of the distance from backstop 20' to backstop 22'. This permits the same gap to be used for relays on one side of wiper 2'. In addition a slight modification is introduced for the purpose of accommodating lateral or horizontal motion of arm 2 on rotation about point 30'. By introducing a bend 45 in member 14 which may be more clearly seen in Fig. 2a, the member 2 is permitted to straighten itself when point 30' is moved on energization of relays 23' or 25', thereby enabling point 30' to move clockwise without lateral or sidewise displacement. The pole pieces A, B, C and D of the relays 23', 24', 25' and 26', respectively, are beveled to permit greater concentration of the magnetic flux and to permit the armatures to be brought into more substantial contact with the pole pieces. In addition flat spring stock 37 and 38 is provided for relays 23' and 25' and 24' and 26' to permit the gaps of the various relays to be accurately adjusted by means of screws 40a, 41, 42 and 43, respectively. Further, each gap between the control armature 17' and respective relays 23' and 25' is .0222", while each gap between control armature 18' and relays 24' and 26', respectively, is set at .0947". The distance between point 31' corresponding to point 31 and the point 40' on the right end of wiper 2' is 4" and the distance between points 30' and 31' is set at ¼". The wiper 2' is controlled in much the same manner as wiper 2 in Fig. 1 with the exception that the distance travelled on energization of the relays is different and point 40' moves clockwise or downward instead of counterclockwise as shown for the corresponding point 40 in the previous embodiment. The following chart is similar to the first chart in that it shows the movements in inches of the wiper end on energization of the various relays from which the operation of this modification is readily apparent.

| Relay | Gap | Pivot Point Movement | Point 40 |
|---|---|---|---|
| 23' | .022 | .0222× .33= .00735 | .00735×17=⅛ |
| 25' | .022 | .022× .66= .014 | .0147×17=¼ |
| 24' | .0947 | .0947× .66= .0625 | .0625×16=1 |
| 26' | .0947 | .0947× .33= .03125 | .03125×16=½ |
| 23' and 25' | | | .00735×17+.0147× 17=⅜ |
| 23' and 26' | | | .00735×17+ .03125×16=⅝ |
| 25' and 26' | | | ¾ |
| 23' and 25' and 26' | | | ⅞ |
| 23' and 24' | | | 1⅛ |
| 25' and 24' | | | 1¼ |
| 23' and 25' and 24' | | | 1⅜ |
| 26' and 24' | | | 1½ |
| 23' and 26' and 24' | | | 1⅝ |
| 25' and 26' and 24' | | | 1¾ |
| 23' and 24' and 25' and 26' | | | 1⅞ |

Thus having described my invention I am appending hereto a series of claims which I believe to encompass the scope of the invention.

What is claimed is:

1. A selecting switch arrangement comprising a plurality of magnets arranged to be energized individually, a selecting arm common to said magnets, an armature for each magnet arranged so that a point thereon is moved a distance individual to the magnet controlling the armature, and a connection between each armature and said selecting arm whereby said selecting arm is moved a distance individually corresponding to the distance moved by the point on an armature controlled by an energized magnet.

2. A switch having a group of magnets which are energized singly and in various combinations individually corresponding to different digits, the improvement comprising a wiper arm common to all of said magnets, and means effective on energization of any of said magnets for moving said arm a distance individually corresponding thereto whereby said wiper arm is moved a distance individually corresponding to one of said digits.

3. In a selecting switch having a plurality of relays individually corresponding to different digits and various combinations thereof individually corresponding to other different digits, an element common to said relays and arranged to be moved by each energized relay a distance individually corresponding thereto whereby said element is placed in a position individually corresponding to one of said digits.

4. A selecting arrangement having a group of relays, a selecting arm common to said relays, one armature associated with certain ones of said relays, and another armature associated with other ones of said relays, each of said armatures having a point thereon connected to said selecting arm, said relays each arranged to move the point on its associated armature an individually corresponding distance whereby said selecting arm is moved an individually corresponding distance.

5. A selecting arrangement wherein a group of relays are provided with a selecting arm common to said relays, an armature operatively connected to said arm and associated with one of said relays, and another armature operatively connected to said arm and associated with another of said relays, each of said armatures arranged to operate said arm a distance individually corresponding to its associated relay on energization of its associated relay and arranged to operate said arm another distance on energization of both said relays.

6. In an arrangement such as claimed in claim 5, means for causing said arm to rotate about the operative connection of one of said armatures on energization of the relay associated with the other armature.

7. In a selecting switch arrangement having a plurality of relays mounted on a carrying plate, a selecting arm having a flexible connection at one end to said carrying plate whereby it is adapted to be rotated to a particular position about any fixed point thereon, an armature for one of said relays, a connection between said arm and said armature, another armature for another of said relays, a connection between said arm and said other armature, retaining means for said armature, and flexible retaining means for said arm and arranged to cooperate with said arm, said respective armatures and respective restraining means for enabling said arm to travel in a predetermined direction, said armatures each cooperating with their respective restraining means on energization of their respective relays for rotating said arm in said predetermined direction about the point where the respective other armature is connected to said arm.

8. A switching arrangement comprising a plurality of relays, a selecting arm common to said relays, some of said relays disposed on one side of said arm and others of said relays disposed on another side of said arm, an armature arrangement for said some relays and an armature arrangement for said other relays, backstops for each armature arrangement, a connecting means between said arm and each armature arrangement, and a spring normally biasing said arm in one direction and prevented from moving said arm beyond a predetermined point by the connection between said arm and one of said armature arrangements and its associated backstops, said backstops cooperating with each armature arrangement for enabling each armature to travel a distance individually corresponding to the relay controlling said armature on energization thereof whereby said arm is moved in a direction opposing said bias to a position individually corresponding to the energized relay.

9. A selecting switch arrangement having a group of relays for controlling a selecting arm, the improvement comprising an armature for each relay arranged so that a point on each armature is moved a distance individually corresponding to its relay on energization of its relay, a connection between said point on each armature and said arm, and means rotating said arm in response to the movement of a point translated through its connection to said arm whereby said arm is rotated to an individually corresponding position.

10. A selecting switch arrangement wherein a group of relays are provided with a common selecting arm and an armature for each relay arranged so that a point on each armature is moved a distance individually corresponding to the relay controlling the armature on energization of said relay, the improvement comprising means including one armature for normally retaining said arm in a particular position, and an arrangement effective in response to the movement of a point on any armature for moving said arm to a position individually corresponding to the relay controlling the movement of said armature.

11. A selecting switch including a plurality of contacts and a wiper arm having a resilient connection at one end thereof and its free end movable to engage successive ones of said contacts, a plurality of magnets having armatures, and means for linking said armatures to said wiper arm so that the energization of each magnet causes movement of the arm to a different one of the contacts and the energization of more than one of the magnets is cumulative in effect on the movement of the arm to thereby cause the arm to engage others of the contacts.

12. In a selecting switch having a row of contacts and a wiper arm arranged to be moved into contact with successive ones of the contacts, a pair of magnets having a common armature, another pair of magnets having a common armature, a link from the first armature connected to a first point on said arm, a link from the second armature having a link connected to another point on said arm, energization of either of said first pair of magnets causing movement of the arm about said other point as a pivot point, and energization of either of said other pair of magnets causing movement of said arm about said first point as a pivot point, whereby said arm may be moved to different ones of said contacts.

References Cited in the file of this patent

UNITED STATES PATENTS

| | | |
|---|---|---|
| 345,561 | Wightman | July 13, 1886 |
| 408,205 | Boisier | Aug. 6, 1889 |
| 1,004,005 | Ferguson | Sept. 26, 1911 |
| 1,147,688 | Schairer | July 20, 1915 |
| 1,234,864 | Brown | July 31, 1917 |
| 1,312,273 | Schwagermann | Aug. 5, 1919 |
| 1,520,821 | Kaisling | Dec. 30, 1924 |
| 1,785,566 | Thompson | Dec. 16, 1930 |
| 1,946,777 | Butusov | Feb. 13, 1934 |
| 2,534,115 | Favre | Dec. 12, 1950 |